(12) United States Patent
Lee

(10) Patent No.: US 7,392,057 B2
(45) Date of Patent: Jun. 24, 2008

(54) MESSAGE SERVICE METHOD FOR MOBILE COMMUNICATION TERMINAL USING POSITION INFORMATION

(75) Inventor: Hyeon-Wook Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 20 days.

(21) Appl. No.: 10/970,978

(22) Filed: Oct. 22, 2004

(65) Prior Publication Data

US 2005/0096069 A1 May 5, 2005

(30) Foreign Application Priority Data

Oct. 31, 2003 (KR) ............ 10-2003-0076862
Nov. 25, 2003 (KR) ............ 10-2003-0084031

(51) Int. Cl.
*H04Q 7/20* (2006.01)
(52) U.S. Cl. ............ 455/456.5; 455/404.1; 455/404.2; 455/412.1; 455/412.2; 455/414.1; 455/456.1; 455/457; 705/1; 705/14; 380/258; 713/155; 713/171
(58) Field of Classification Search ............ 455/404.1, 455/404.2, 410, 412.1, 412.2, 414.1–414.4, 455/456.1–457; 705/1, 14; 380/258; 713/155, 713/179
See application file for complete search history.

(56) References Cited

U.S. PATENT DOCUMENTS

| | | | | |
|---|---|---|---|---|
| 5,046,082 | A * | 9/1991 | Zicker et al. ............ 455/419 |
| 5,086,394 | A * | 2/1992 | Shapira ............ 705/1 |
| 5,799,082 | A * | 8/1998 | Murphy et al. ............ 713/179 |
| 6,208,866 | B1 * | 3/2001 | Rouhollahzadeh et al. ............ 455/456.5 |
| 6,301,484 | B1 * | 10/2001 | Rogers et al. ............ 455/466 |
| 6,332,127 | B1 * | 12/2001 | Bandera et al. ............ 705/14 |
| 6,487,586 | B2 * | 11/2002 | Ogilvie et al. ............ 709/206 |
| 6,549,768 | B1 * | 4/2003 | Fraccaroli ............ 455/456.3 |
| 6,618,593 | B1 * | 9/2003 | Drutman et al. ............ 455/456.3 |
| 6,677,894 | B2 * | 1/2004 | Sheynblat et al. ............ 342/357.1 |
| 6,731,940 | B1 * | 5/2004 | Nagendran ............ 455/456.1 |
| 6,819,919 | B1 * | 11/2004 | Tanaka ............ 455/414.1 |
| 6,880,079 | B2 * | 4/2005 | Kefford et al. ............ 713/155 |
| 6,985,588 | B1 * | 1/2006 | Glick et al. ............ 380/258 |
| 7,143,289 | B2 * | 11/2006 | Denning et al. ............ 713/168 |

* cited by examiner

*Primary Examiner*—Steve M. D'Agosta
(74) *Attorney, Agent, or Firm*—The Farrell Law Firm, PC

(57) ABSTRACT

A system and method for providing a message service. Position information and/or security information is inserted into messages before transmission. A receiving mobile terminal may open the received message depending on its position or knowledge of the security information.

23 Claims, 13 Drawing Sheets

MESSAGE SERVICE METHOD FOR MOBILE COMMUNICATION TERMINAL USING POSITION INFORMATION

PRIORITY

This application claims priority to applications entitled "MESSAGE SERVICE METHOD FOR MOBILE COMMUNICATION TERMINAL USING POSITION INFORMATION AND SYSTEM THEREFOR", filed in the Korean Intellectual Property Office on Oct. 31, 2003 and assigned Serial No. 2003-76862, and on Nov. 25, 2003 and assigned Serial No. 2003-84031, the contents of which are hereby incorporated by reference.

BACKGROUND OF THE INVENTION

1. Field of the Invention

The present invention relates generally to a message service method for a mobile communication terminal, and more particularly to a method and system for providing a destination user with a messaging service or a security messaging service when conditions reserved by an origination user are met.

2. Description of the Related Art

Conventionally, a mobile communication terminal (also called a mobile station) has provided a text message service or an SMS (Short Message Service) widely used for a special control function of the mobile communication terminal. Recently, however, a variety of message services, for example, a multimedia message service, an E-mail service, an instant messenger service, etc., are currently being provided to users, and other improved message services will be provided to the users in the future.

Accordingly, he aforementioned message service includes a basic service for providing users with only messages and an additional service for enabling a transmission user to establish a specific condition required for transmitting desired messages to a reception user. For example, the additional service may be an origination time reservation time for the SMS service. More Specifically, when the transmission user reserves a message origination time of a predetermined text message, a mobile terminal or a mobile communication network transmits a corresponding text message to a receiver mobile terminal at the reserved time such that a reception user can recognize the text message.

As another example, the additional service may be a text message broadcasting service for simultaneously broadcasting a text message to mobile terminals positioned in a specific area at one time. This function has been widely used for commercial purposes. For example, a specific company may distribute discount coupons to a plurality of mobile terminals positioned within a predetermined range of a business place.

The message service for the mobile terminal is required for transmitting a desired message to a reception user, and provides additional functions for reserving an origination time or determining a specific area, resulting in greater convenience for the user.

The origination time reservation function can reserve only a message origination time. The function for transmitting a message to a plurality of mobile terminals positioned in a specific area is unable to determine individual mobile terminals that will receive the message, and the mobile terminals not positioned in the specific area at the message transmission time are unable to receive the message.

However, when a specific mobile terminal determined by the transmission user is positioned within a desired range of the transmission user, the transmission user may wish to transmit a message to the specific mobile terminal user. For example, when staff of a specific company attends their offices, official announcement messages for all offices or all sections may be required to be displayed on mobile terminals of corresponding staff. For another example, if a user must travel on a business trip, the user may wish to receive a message indicating of principal programs that must be performed at the business place, upon arrival at the business place.

When receiving the message, the mobile terminal for providing users with message service functions displays a specific message indicating that the message has been received, in order for the user to recognize the message reception. Provided that a user establishes a function for displaying reception message contents, the reception message contents are also displayed on a display. Accordingly, if the reception message contents are automatically displayed at a message reception time, not only a mobile terminal user but also other users can see the message. Further, if a user leaves the mobile terminal somewhere in the view of others and then leaves the place even though a function for displaying the reception message contents is released, other users may operate the user's mobile terminal to view the message contents.

Commonly, a mobile terminal has a locking function to prevent others who do not know a password set by a user from fraudulently operating the user's mobile terminal. If the user establishes the locking function, although the user leaves his or her mobile terminal somewhere in view of other users and then leaves the place, the other users are unable to operate the user's mobile terminal and cannot view the message contents. However, the locking function is adapted to lock the mobile terminal, instead of locking just a message reading function. Accordingly, if the aforementioned locking function is established, the user must enter his or her password whenever the user uses the mobile terminal, and must re-establish the locking function after using the mobile terminal, resulting in greater inconvenience for the user. As a result, most users rarely use the aforementioned locking function.

Therefore, a mobile terminal requires a message security service to prevent message contents from being exposed to others. There are many technologies for implementing the message security service. For example, one method encrypts a desired message using an encryption key negotiated between a transmission user and a reception user. The transmission mobile terminal receives the encryption key from the transmission user, encrypts the message using the encryption key, and transmits the encrypted message. The reception mobile terminal receives a decryption key matching the encryption key from the reception user, decrypts the received encryption message using the received decryption key, and displays the decrypted result message. Therefore, only the reception user determined by the transmission user can view the message contents, resulting in message security implementation.

However, the aforementioned technology for implementing message security using an encryption key negotiated between the transmission user and the reception user must enable the transmission user to share the encryption key with the reception user. Therefore, the encryption key is in danger of being hacked when the transmission user and the reception user share the encryption key. Further, if the reception user forgets the encryption key, the reception user is unable to recognize the encryption message contents.

Provided that the user finds the encryption key and the message is initially opened, the message can viewed anywhere, such that it is difficult to guarantee message security when the mobile terminal is stolen or lost.

That is, although the message is encrypted, this message is preserved until the reception user deletes the message even when the transmission user does not want to preserve the message, such that the possibility of fraudulently exposing the message contents to others increases.

SUMMARY OF THE INVENTION

It is, therefore, an object of the present invention to provide a message service method and system for enabling a transmission user to reserve reception of a transmission message, such that the message is received when a specific mobile terminal determined by the transmission user is positioned in a desired location.

It is another object of the present invention to provide a message service method and system for enabling a transmission user to reserve the display of a transmission message, such that the transmission message is displayed when the specific mobile terminal determined by the transmission user is positioned in a desired location.

It is yet another object of the present invention to provide a message service method and system for enhancing security of a message service for use in a mobile terminal.

It is yet another object of the present invention to provide a message service method and system for providing a reception user with a security message service without informing the reception user of a message security key.

It is yet another object of the present invention to provide a message service method and system for enabling a user to, view a security message at a predetermined place only, resulting in increased security of a message service.

It is yet another object of the present invention to provide a message service method and system for enabling a message received in a reception mobile terminal to be limitedly preserved, resulting in increased security of a message service.

In accordance with one aspect of the present invention, the above and other objects can be substantially accomplished by providing a method for message services for use in a mobile communication terminal. The method includes the steps of: generating a position reservation message including positional information for designating a position at which the message may be displayed; designating a mobile communication terminal to receive the position reservation message as a destination terminal; and transmitting the position reservation message to the destination mobile communication terminal.

The reception mobile terminal may receive the position reservation message according to at least one of the following schemes of the present invention.

In accordance with one scheme of the present invention, upon receipt of the position reservation message, a mobile communication network transmits a corresponding message to the reception mobile terminal when a current position of the reception mobile terminal, which identifies the destination of the position reservation message, matches a prescribed position of the position reservation message.

In accordance with another scheme of the present invention, if the mobile communication network does not manage the position of the mobile terminal, and immediately transmits the position reservation message to the reception mobile terminal, the mobile terminal receives the position reservation message, and outputs/displays a corresponding message when the current position of the mobile terminal matches the prescribed position of the position reservation message.

In accordance with another aspect of the present invention, there is provided a method for message services for use in a mobile communication terminal. The method includes the steps of: establishing a security mode using reading position information for determining a readable position at which a message to be transmitted can be read; generating a security message; designating the mobile communication terminal to receive the security message as a destination terminal; and transmitting the security message to the mobile communication terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. Additionally, a detailed description of known functions and configurations incorporated herein will be omitted for conciseness.

Figure 1:
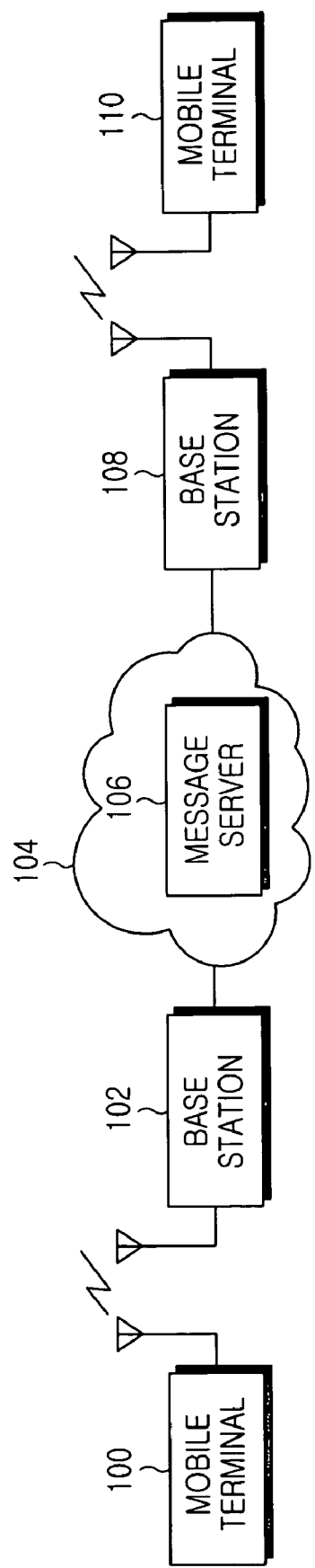
FIG. 1 is a block diagram illustrating a mobile communication system.

FIG. 1 is a block diagram illustrating a mobile communication system in accordance with an embodiment of the present invention. Referring to FIG. 1, a mobile terminal 100 wirelessly communicates with a base station 102, and a mobile terminal 110 wirelessly communicates with a base station 108 in such a way that a mobile communication service can be provided to subscribers or users over a mobile communication network 104. Typically, the mobile communication network 104 is provided by a mobile communication service enterprise, and includes a message server 106 to provide mobile terminals 100 and 110 with a message service. If the message server 106 uses an SMS (Short Message Service), it is referred to as an SMSC (Short Message Service Center) positioned in a mobile communication network 104.

For the convenience of description, herein, the mobile terminal 100 is described as a transmission mobile terminal, and the other mobile terminal 110 is described as a reception mobile terminal for a reception user, i.e., a destination mobile terminal.

Figure 2:
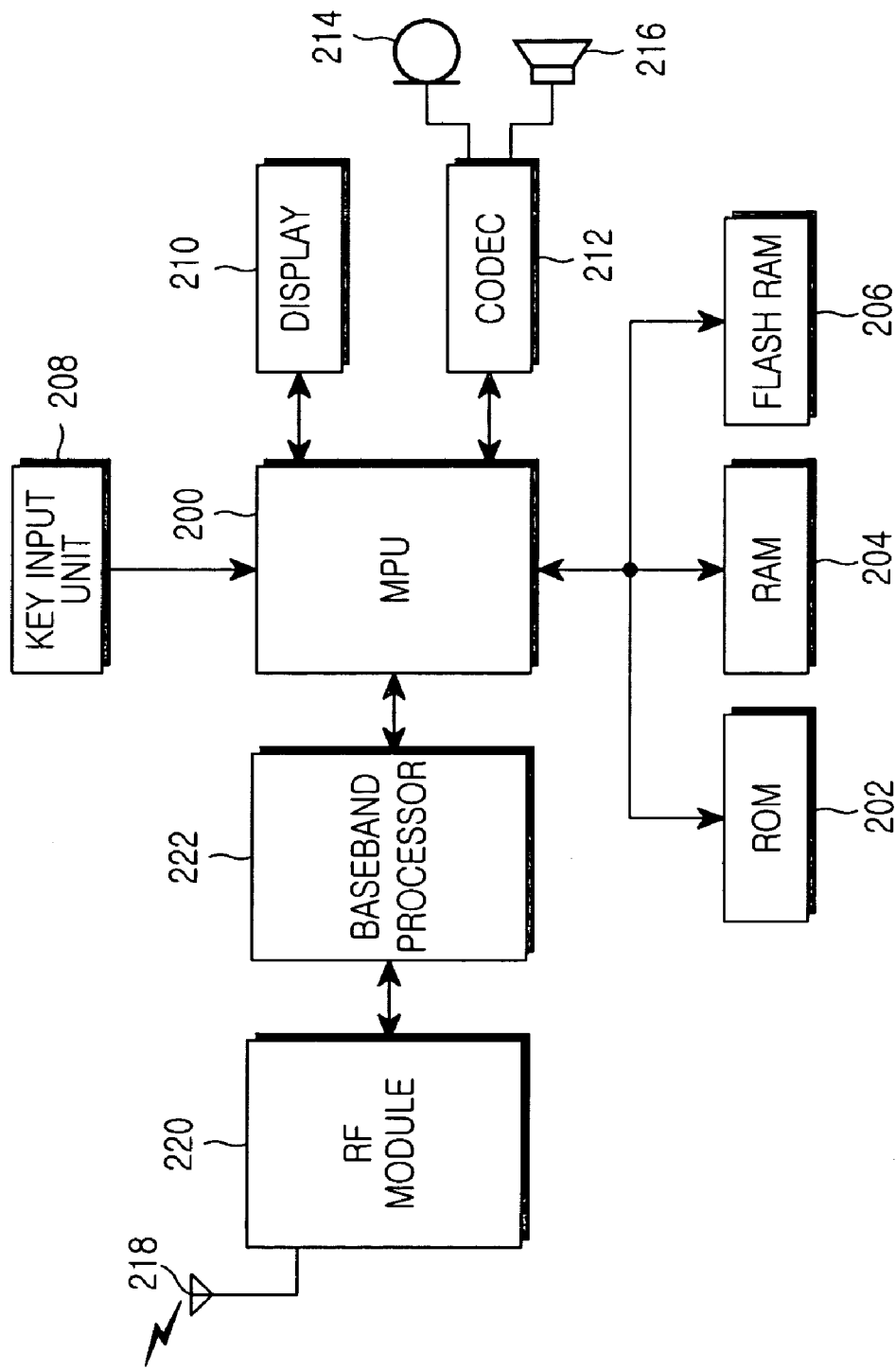
FIG. 2 is a block diagram illustrating a mobile terminal.

FIG. 2 is a block diagram illustrating a configuration of the transmission and reception mobile terminals 100 and 110. Referring to FIG. 2, the MPU (Micro-Processor Unit) 200 processes or controls a variety of functions, for example, a telephone conversation, data communication, a message service, etc, and processes a position reservation message service function along with typical functions. A ROM (Read Only Memory) 202 stores microcodes of programs for processing/controlling the MPU 200 and various reference data. A RAM (Random Access Memory) 204 is provided as the working memory of the MPU 200. A Flash RAM 206 provides a specific area for storing messages and various updateable storage data. The key input unit 208 includes a plurality of number buttons 0-9 and a plurality of function keys, for example, * and # buttons, a menu button, a message button, a selection button, a call button, a deletion button, a power on/off button, and a volume button, etc. The key input unit 208 transmits key input data corresponding to the user-pressed key to the MPU 200. The display 210 displays image data corresponding to a control signal of the MPU 200 on its screen.

The CODEC (Coder-Decoder) 212, which is connected to the MPU 200, and a microphone 214 and a speaker 216, which are connected to the CODEC 212, establish a phone call or record a voice signal. The RF (Radio Frequency) module 220 wirelessly communicates with the base station 102 or 108 over an antenna 218. The RF module 220 modulates a transmission signal transmitted from the MPU 200 via the baseband processor 222, and transmits the modulated RF signal over the antenna 218. The RF module 220 demodulates the RF signal received via the antenna 218, and transmits the demodulated result to the MPU 200 via the baseband processor 222. The baseband processor 222 processes a baseband signal communicated between the RF module 220 and the MPU 200.

Figure 3:
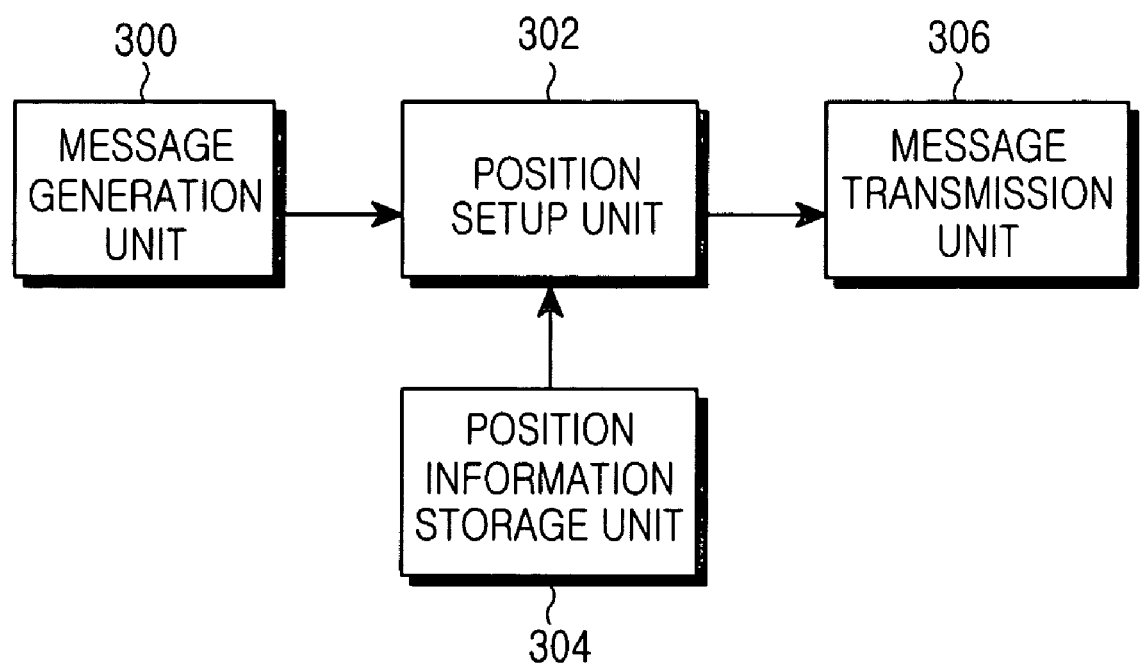
FIG. 3 is a block diagram illustrating a software module of a mobile terminal for transmitting a position reservation message in accordance with an embodiment of the present invention.

FIG. 3 is a block diagram illustrating a software module of the transmission mobile terminal 100. The software module is used to transmit a position reservation message (also called a position restricted message) executed by the MPU 200. The software module includes a message generation unit 300 for generating a message to be transmitted, a position setup unit 302 for adding position information that indicates a specific position at which a message will be displayed, to the message to be transmitted, thereby generating a position reservation message, a position information storage unit 304 for storing position information to be added to the position reservation message, and a message transmission unit 306 for transmitting a message.

Figure 4:
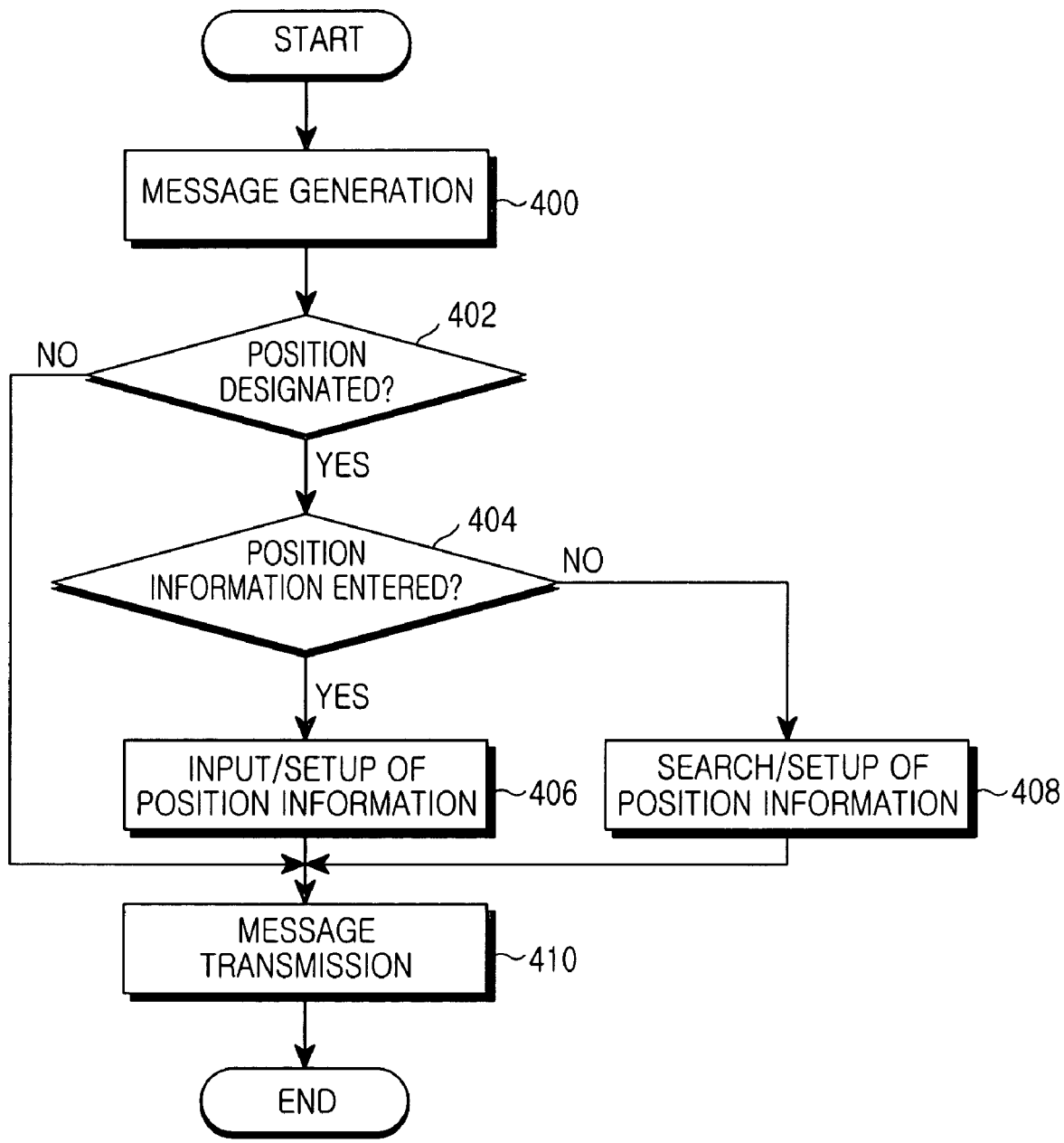
FIG. 4 is a flow chart illustrating a message transmission method for transmitting a position reservation message of a mobile terminal in accordance with an embodiment of the present invention.

FIG. 4 is a flow chart illustrating a message transmission method for transmitting a position reservation message in accordance with an embodiment of the present invention. The message transmission process executed by the MPU 200 of the transmission mobile terminal 100 includes a plurality of steps 400-410, and uses the software modules illustrated in FIG. 3. If a user of the transmission mobile terminal 100 wishes to generate a desired message, a message composition menu button is selected from among a plurality of key buttons of the key input unit 208, and the message contents is then entered at step 400. The generated message is immediately transmitted to a destination, or is stored in a specific area of the mobile terminal 100 and is later transmitted to a destination.

After the user generates a message, preferably, a prompt, i.e., words or menus, for asking whether a position is to be designated is displayed on the display 210 at step 402. If the user selects to transmit a message as a position reservation message, a position reservation message is generated at steps 404-408. However, if the user decides not to transmit a message as a position reservation message, i.e., decides to transmit a common message, the message is transmitted at step 410.

At step 404, it is determined if new position information has been entered. If the user newly enters position information at step 404, the user-selected position information is added to a position information transmission message to determine a reserved position, generating a position reservation message. However, if new position information has not been entered, the user searches for previous position information, selects the searched previous position information, and adds the previous information to the transmission message to determine a reserved position at step 408, thereby generating a position reservation message.

The generated message is transmitted to a destination mobile terminal, i.e., a reception mobile terminal 110, at step 410.

The position reservation message is displayed on the display 210 of the reception mobile terminal 110 when the reception mobile terminal 110 is positioned at a reserved position determined by the transmission user. Therefore, the transmitted message can be recognized by the reception user when the reception mobile terminal 110 is positioned (located) at the reserved position desired by the transmission user. In this case, if the user determines the reception message display function of a common mobile terminal, message contents are displayed. However, if the reception message display function is not determined by the user, only information indicating message reception is displayed, and message contents are displayed by a key input signal of the user.

Additionally, the above-described method, which enables the transmission message of the transmission user to be displayed on the reception mobile terminal 110 when the reception mobile terminal 110 is positioned at a position desired by the transmission user, may be implemented in either the mobile communication network 104 or the reception mobile terminal 110.

In a first embodiment for implementing the above-described method, the mobile communication network 104 stores the position reservation message transmitted from the transmission mobile terminal 100 in the message server of the mobile communication network 104, and monitors the position of the reception mobile terminal 110, such that the message is transmitted to the reception mobile terminal 110 when arriving at the reserved position. Thereafter, the reception mobile terminal 110 displays the corresponding message.

From the viewpoint of the reception mobile terminal 110, the message, which is received after having been stored in the mobile communication network 104, appears to be a common message service, in that it is processed and displayed in the same manner as a common message reception case. Therefore, there is no need for the reception mobile terminal 110 to implement additional functions.

A position reservation message service can be implemented on the condition that a predetermined function is added to the mobile communication network 104, such that the reception mobile terminal 110 can use a general mobile terminal without any change. However, the mobile communication network 104 must continue to monitor the position of the reception mobile terminal 110 until the reception mobile terminal 110 is positioned at a reserved position, which may undesirably increase the load of the system. Further, if the reserved position is a position that is difficult for the mobile communication network 104 to recognize, i.e., outside of a coverage area of the mobile communication network 104, a desired service may not be established.

Accordingly, in a second embodiment for implementing the above-described method, the reception mobile terminal 110 self-reads position information included in a position reservation message, recognizes its own current position, and displays a specific message on the display 210 when the current position matches a reserved position. More specifically, if the transmission mobile terminal 100 transmits a position reservation message, the position reservation message is received in the reception mobile terminal 110 over the mobile communication network 104. Thereafter, the reception mobile terminal 110 stores the received position reservation message instead of immediately displaying it, and then displays a message when the reception mobile terminal 110 is positioned in a predetermined reserved position. The second embodiment does not increase load of the mobile communication network 104 because the position reservation message is processed in the same manner as in a general message service.

After a message is transmitted to the reception mobile terminal 110, a message can be displayed regardless of the current condition of the mobile communication network 104. However, the reception mobile terminal 110 must perform a function for checking its current position, and also a position reservation process function.

For example, position information included in a position reservation message to determine a current position of the transmission user may include longitude, latitude, altitude, etc. In the case of the altitude, data accuracy is lowered even though a GPS (Global Positioning System) is used, such that it is preferable for the latitude and longitude to be used as such position information. The transmission user determines position information after the mobile communication network 104 or the reception mobile terminal 110 considers an error and accuracy of checkable position information on a current position of the reception mobile terminal 110.

Figure 6:
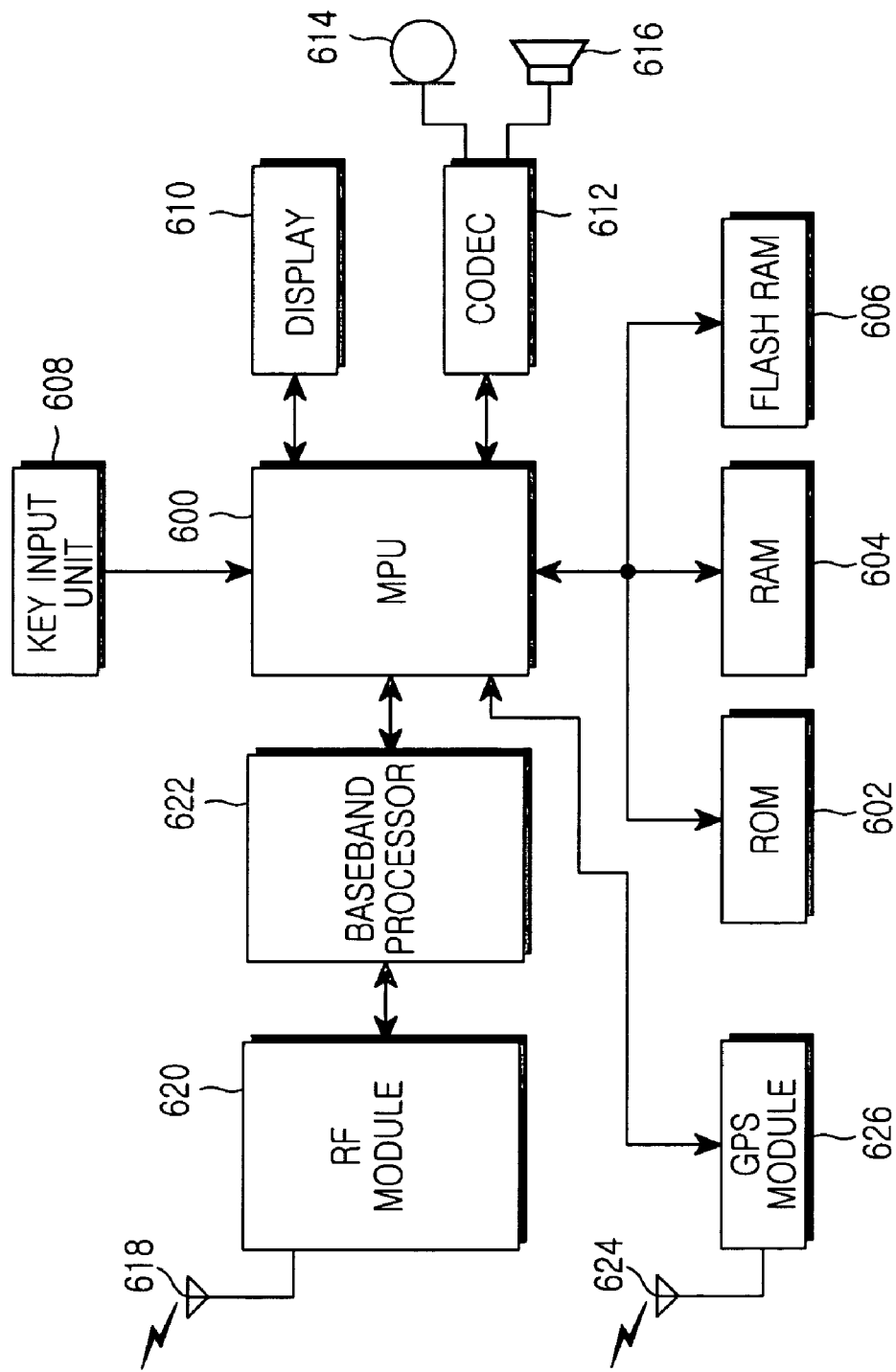
FIG. 6 is a block diagram illustrating a mobile terminal in accordance with another embodiment of the present invention.

When using a GPS module 626 as illustrated in FIG. 6, the reception mobile terminal 110 can recognize latitude and longitude of its own current position upon receiving a position signal from the GPS satellite.

Alternatively, the reception mobile terminal 110 may receive the longitude and latitude of a serving base station, which provides the reception mobile terminal 110 with a mobile communication service from the serving base station, and may adapt the received longitude and latitude information as current position information. In this case, the current position information identifies a serving base station position, instead of the reception mobile terminal 110's position, such that the transmission user must determine accuracy of the position information in consideration of the base station position.

Information for indicating that a current message is a position reservation message for use in a position reservation message service, i.e., position reservation information, must be checked by the mobile communication network 104 or the reception mobile terminal 110. Therefore, it must be included in the position reservation message and must then be transmitted. In order to transmit the message including the aforementioned information, an additional message format including a field for transmitting the aforementioned information may be defined and used. However, in this case, the above-described message service is not compatible with a common message service. Preferably, in association with the transmission and reception mobile terminals 100 and 110 and the mobile communication network 104, some parts of a user data field for transmitting message contents of a common message format are defined as a field for transmitting the above-described information.

Figure 5:
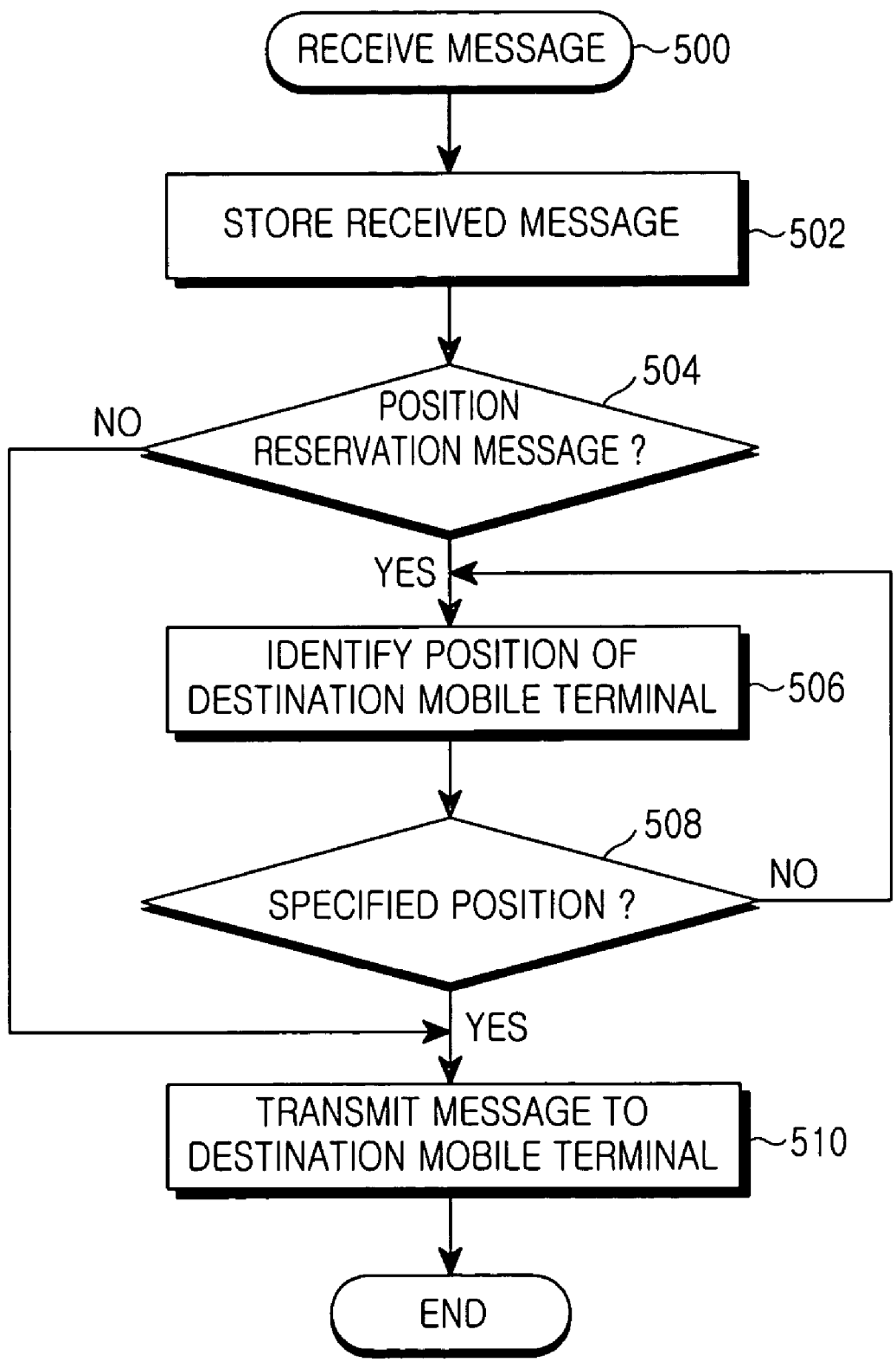
FIG. 5 is a flow chart illustrating a message service method for processing a position reservation message of a message server in accordance with an embodiment of the present invention.

FIG. 5 is a flow chart illustrating a message service method for transmitting a message to the reception mobile terminal 110 when the mobile communication network 104 monitors a current position of the reception mobile terminal 110 and determines that the reception mobile terminal 110 is positioned in a prescribed position of the position reservation message. In a message service process of the message server 106 of the mobile communication network 104, the message server 106 receives a message from the transmission mobile terminal 100 and stores the received message at steps 500-502. At step 504, the message server 106 determines if the received message is a position reservation message. If the received message is a general message, the general message is transmitted to the reception mobile terminal 110 at step 510. However, if the received message is a position reservation message, the message server 106 determines if the position of the reception mobile terminal 110 matches a specified position of the position reservation message at steps 506-508, i.e., monitors the location of the reception mobile terminal 110, and transmits the position reservation message to the reception mobile terminal 110 at step 510, when the reception mobile terminal 110 arrives at the reserved position.

The position of the reception mobile terminal 110 can be identified upon receiving location registration information associated with the reception mobile terminal 110 from the mobile communication network 104. The position information of the reception mobile terminal 110 is compared with specified position information of the position reservation message at step 508 such that it is determined whether the position information of the reception mobile terminal 110 matches the specified position information of the position reservation message. If it is determined that the position information of the reception mobile terminal 110 matches the specified position information of the position reservation message at step 508, the message server 106 proceeds to the step 510. However, if it is determined that the position information of the reception mobile terminal 110 is different from the specified position information of the position reservation message at step 508, the message server 106 returns to step 506.

Accordingly, when the position reservation message transmitted from the transmission mobile terminal 100 is stored in the message server 106 and the reception mobile terminal 110 arrives at the reserved position, a corresponding message is transmitted to the reception mobile terminal 110, such that the reception user can view the message. In this case, provided that the reception mobile terminal 110 arrives at the reserved position when the message server 106 receives the position reservation message, the message will be immediately transmitted to the reception mobile terminal 110. Provided that the reception mobile terminal 110 does not arrive at the reserved position after the message server 106 receives the position reservation message, the mobile communication enterprise determines how long the position reservation message will be stored according to predetermined operation/maintenance regulations.

In order to enable the mobile communication network 104 to handle the position reservation message in the same manner as in the general message, the reception mobile terminal 110 must include a predetermined function to identify its own current position, such that the mobile communication network 104 does not immediately transmit a message to the reception mobile terminal 110, and the reception mobile terminal 110 can display the message when it is positioned at a predetermined reserved position of the received position reservation message.

FIG. 6 is a block diagram illustrating a mobile terminal capable of checking its current position in accordance with another embodiment of the present invention. The mobile terminal of FIG. 6 further includes a GPS (Global Positioning System) module 626 as compared to the mobile terminal illustrated in FIG. 2. The GPS module 626 receives a position information signal from a GPS satellite via an antenna 624, and transmits it to an MPU 600. The MPU 600 recognizes longitude, latitude, altitude, etc., from the position information signal received from the GPS module 626. Because a ROM (Read Only Memory) 602, a RAM (Random Access Memory) 604, a flash RAM 606, a key input unit 608, a display 610, a CODEC (Coder-Decoder) 612, a microphone 614, a speaker 616, an antenna 618, an RF (Radio Frequency) module 620, and a baseband processor 622 are substantially the same as those illustrated in FIG. 2, these components will not be described in detail again.

The mobile terminal illustrated in FIG. 6 may be used as a transmission mobile terminal 100. When the reception mobile terminal 110 receives longitude and latitude data of a serving base station, which provides the reception mobile terminal 110 with a mobile communication service, from the serving base station, and recognizes the longitude and latitude data of the serving base station as current position information, the mobile terminal illustrated in FIG. 2 may be used as the reception mobile terminal 110.

Figure 7:
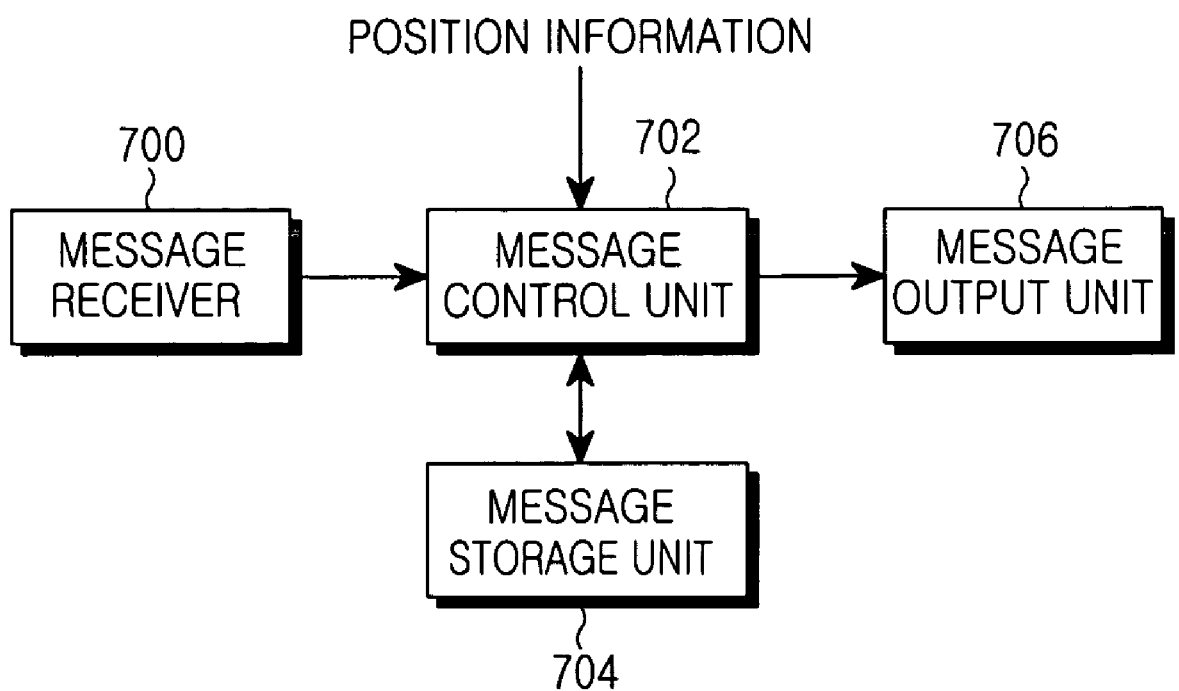
FIG. 7 is a block diagram illustrating a software module of a mobile terminal for receiving a position reservation message in accordance with an embodiment of the present invention.

FIG. 7 is a block diagram illustrating a software module for receiving a position reservation message, which is executed by the MPU 600 illustrated in FIG. 6 in the reception mobile terminal 110, in accordance with an embodiment of the present invention. Referring to FIG. 7, the software module includes a message receiver 700 for receiving a message, a message control unit 702 for managing the received message, a message storage unit 704 for storing the message, and a message output unit 706 for outputting the message.

Figure 8:
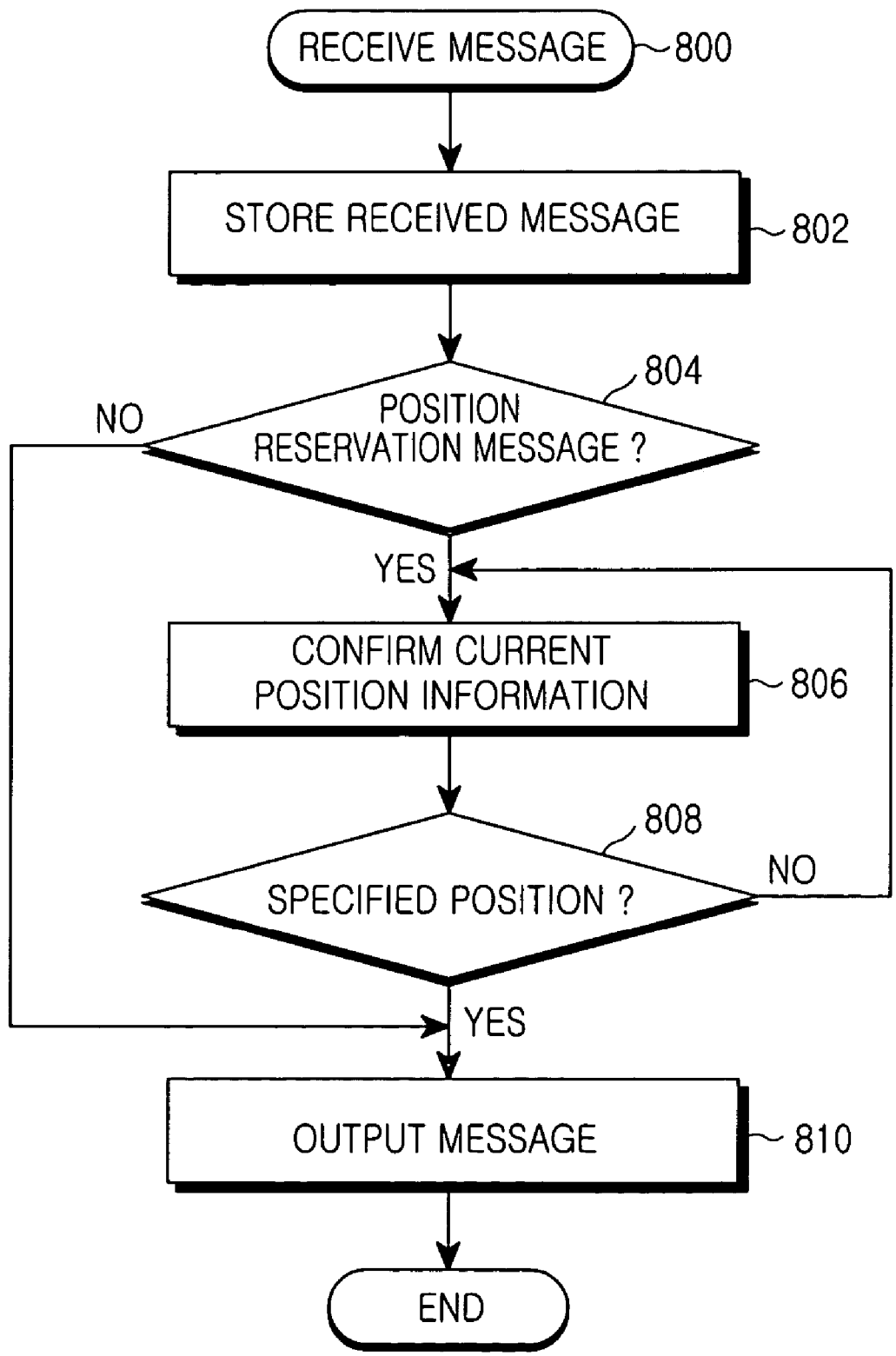
FIG. 8 is a flow chart illustrating a message reception method for receiving a position reservation message of a mobile terminal in accordance with an embodiment of the present invention.

FIG. 8 is a flow chart illustrating a message reception method for receiving a position reservation message in accordance with an embodiment of the present invention. More specifically, FIG. 8 illustrates a plurality of process steps 800-810 of the MPU 600 in the reception mobile terminal 110 using the above-described software module illustrated in FIG. 7.

In the mobile terminal illustrated in FIG. 6, the MPU 600 receives a message at step 800, and stores the received message at step 802. The MPU 600 determines if the received message is a position reservation message at step 804. If the received message is a general message, the MPU 600 outputs the message to the display 610 such that the display 610 displays the message. However, if the received message is the position reservation message, the MPU 600 determines if a current position matches a specified position of the position reservation message at steps 806-808. If the current position matches the specified position of the position reservation message at step 808, the MPU 600 outputs the message to the display 610 at step 810 such that the display 610 displays the message. In this case, the MPU 600 confirms current position information on the basis of GPS position information obtained by the GPS module 626 at step 806. More specifically, the MPU 600 may receive longitude and latitude information of the serving base station 108 from the serving base station 108, and may adapt the received longitude and latitude information as current position information. The recognized current position information is compared with specified position information of the position reservation message at step 808. If the recognized current position information matches the specified position information of the position reservation message at step 808, the MPU proceeds to step 810. However, if the recognized current position information is different from the specified position information of the position reservation message at step 808, the MPU returns to step 806.

Therefore, in accordance with the present invention, a transmission message of the transmission user is transmitted to a user of a specific mobile terminal when the specific mobile terminal determined by the transmission user is positioned at a position desired by the transmission user, such that the transmission user can freely transmit a desired message to a desired destination or place at an appropriate time, resulting in a high value-added message service and greater convenience of the user.

Figure 9:
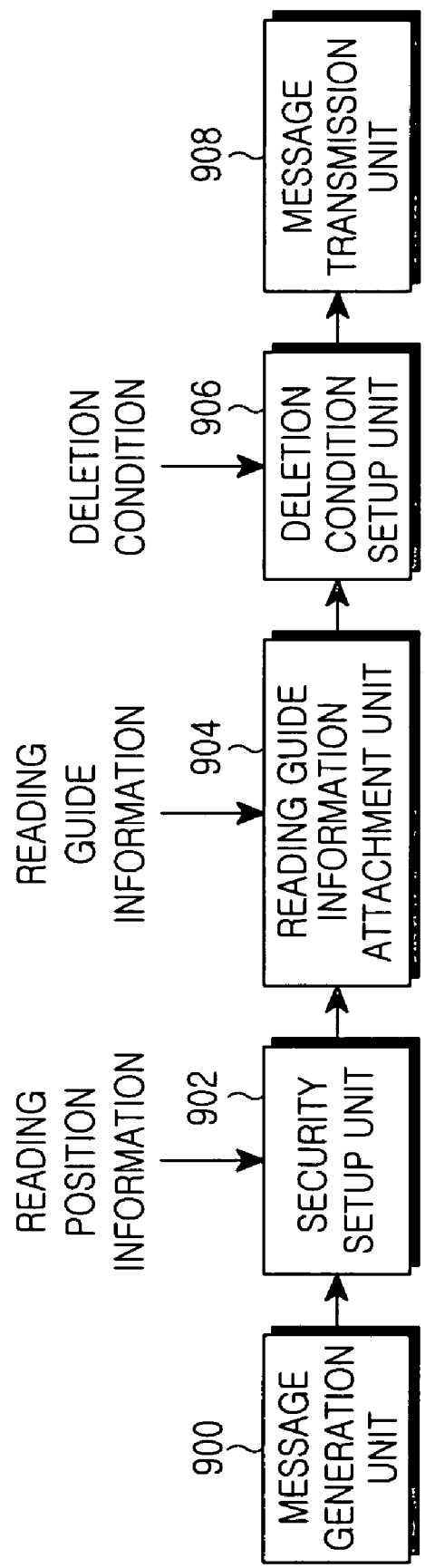
FIG. 9 is a block diagram illustrating a software module for transmitting a security message of a mobile terminal in accordance with an embodiment of the present invention.

FIG. 9 is a block diagram illustrating a software module for transmitting a security message executed by the MPU 600 in the transmission mobile terminal 100 of FIG. 6 in accordance with an embodiment of the present invention. Referring to FIG. 9, the software module includes a message generation unit 900 for generating a message to be transmitted, a security setup unit 902 for establishing a security mode using read position information associated with the message to be transmitted, thereby generating a security message, a reading guide information attachment unit 904 for attaching reading guide information to the security message, a deletion condition setup unit 906 for establishing a variety of deletion conditions associated with the security message, and a message transmission unit 908 for transmitting a message.

Figure 10:
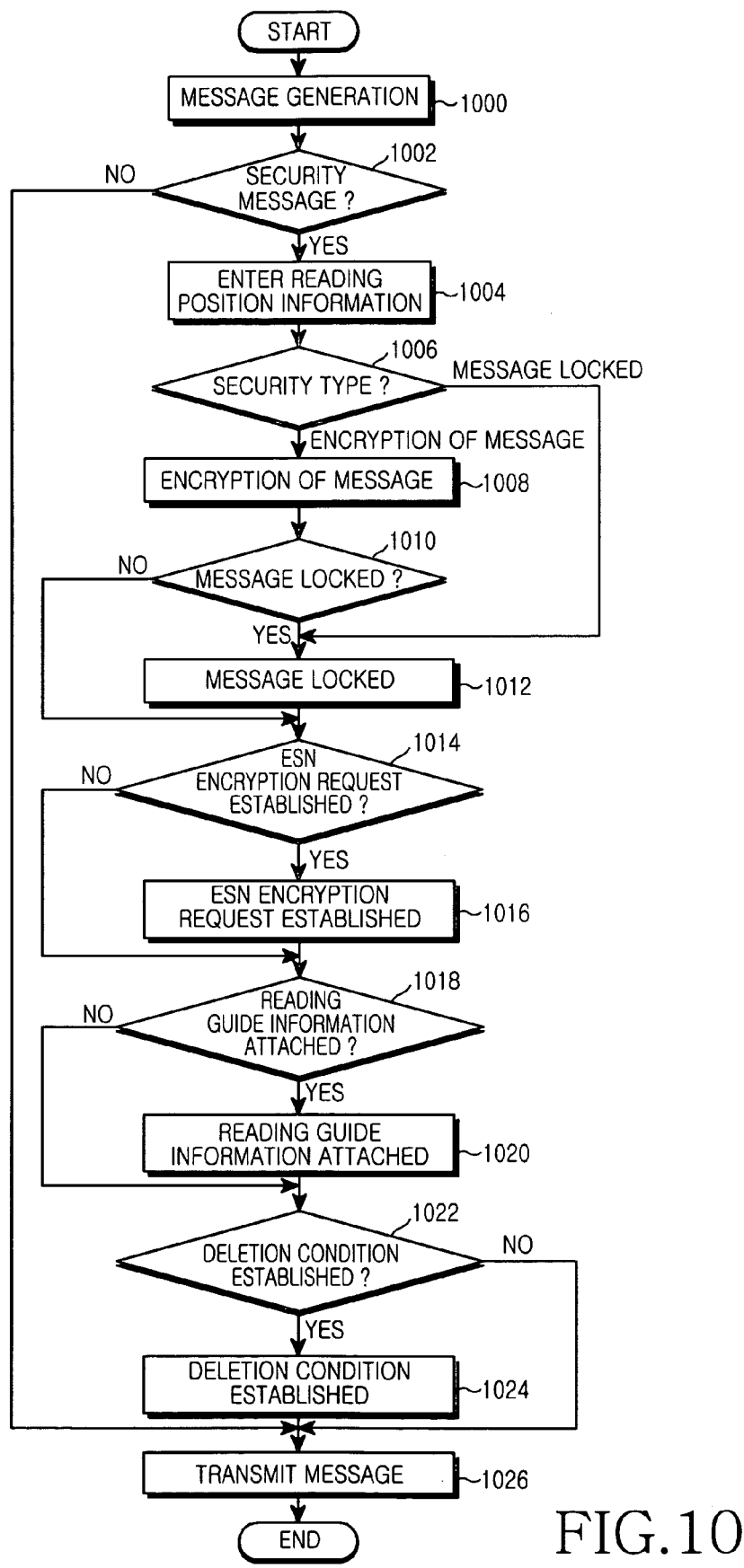
FIG. 10 is a flow chart illustrating a message transmission method for performing a security message transmission process of a mobile terminal in accordance with an embodiment of the present invention.

FIG. 10 is a flow chart illustrating a message transmission process including steps 1000-1026 using the MPU 600 of the transmission mobile terminal 100 in accordance with an embodiment of the present invention. If the user of the transmission mobile terminal 100 wishes to generate a message, the user selects a message composition menu button from among a plurality of buttons of the key input unit 608, and enters the message contents, such that the MPU 600 generates the message at step 1000. The generated message is immediately transmitted to a destination by the user, is stored, and is then transmitted to the destination by the user. Alternatively, the generated message is stored and is transmitted to the destination by the user, or is transmitted to the destination at a specified transmission time.

If the user enters the generated message by pressing a predetermined transmission key on the key input unit 608, a prompt, i.e., a question or phrase, asking whether a security message is established is displayed on the display 610. If the user selects the security message at step 1002, the MPU 600 generates the security message in steps 1004-1024, and transmits the security message at step 1026. If the user does not select the security message, i.e., decides to send a general message at step 1002, the MPU 600 transmits the message in step 1026.

As illustrated in steps 1004-1024, a security mode is established on a message to be transmitted using user-selected reading position information such that the security message is generated. A variety of functions may be selectively applied to the generated security message according to a user selection signal, for example, ESN (Electronic Serial Number) encryption request setup, reading guide information attachment, establishment of various deletion conditions, etc.

Reading position information to be used for establishing the security mode is received from the user via the key input unit 608 at step 1004, and then the security mode is established using the reading position information at steps 1006-1012. In this case, the security mode is established as a user-selected one of two modes (i.e., a locking mode and an encryption mode), or is established as both of the two modes. The reading position information indicates position information determined by a transmission user in association with the security message received in the reception mobile terminal 110. The reading position information of the reception user is determined by the transmission user, and may include longitude, latitude, altitude, etc. of a viewable position. Accuracy of the altitude is lowered even though a GPS is used. Therefore, it is preferable that the longitude and the latitude are adapted as position information.

The transmission user determines reading position information by considering errors and precision, etc. of checkable position information on a current position of the reception mobile terminal 110. If the reception mobile terminal 110 includes the GPS module 626 illustrated in FIG. 6, longitude and latitude data of a current position of the reception mobile terminal 110 can be recognized as current position information upon receiving a position signal from the GPS satellite. Otherwise, the reception mobile terminal 110 receives longitude and latitude information of the serving base station 108 from the serving base station 108, such that the received longitude and latitude information of the serving base station 108 can be recognized as current position information. However, in this case, the current position information indicates the serving base station 108's position, instead of the reception mobile terminal 110's position, such that the transmission user must determine precision of the reading position information in consideration of the current position information.

The MPU 600 asks a user for a security mode using the display 610. If the user selects a message encryption mode, the MPU 600 proceeds to step 1008. However, if the user selects a message lock mode, the MPU 600 proceeds to step 1012. The user-entry reading position information is used to encrypt the message contents at step 1008. Thereafter, the MPU 600 asks the user for specific information indicating whether an encrypted message will be locked, using the display 610. If the message locking is determined, the MPU 600 proceeds to step 1012. However, if the message locking is not determined, the MPU 600 proceeds to step 1014.

A non-encrypted message or an encrypted message is locked by adapting the reading position information as a lock key. Therefore, a message to be transmitted is determined to be either one of a locking mode, an encryption mode, and a locking/encryption mode, such that the message is generated as a security message. In this case, technologies such as the locking and the encryption, etc. are well known to those skilled in the art, such that their detailed description will herein be omitted for the convenience of description.

The ESN encryption request may be established on the security message. The reading guide message and a predetermined deletion condition may be attached to the security message. The ESN encryption request indicates that the encryption of the encrypted- or locked security message contents is requested for the mobile communication network 104 using the reception mobile terminal 110's ESN. The reading guide information indicates specific information for directing a readable position to the reception user. For example, the contents of the reading guide information may be determined to be 'Home', 'Office', 'Working Position 1', etc. Preferably, the reading guide information is determined to be specific information, which can be recognized by only the reception user. Provided that the readable position is pre-engaged between the transmission and reception users, it is preferable that the reading guide information is not attached to increase security.

The deletion condition indicates a predetermined condition, which must be deleted after the security message has been received in the reception mobile terminal 110. A variety of deletion conditions may be determined, for example, 'the number of reading times', 'a time consumed after an initial reading operation', 'the number of abnormal reading attempts', 'a specific time', 'a re-transmission attempt', 'separation from a reading area', etc. More deletion conditions may be determined if needed.

The number of reading times is used to automatically delete the security message when the reception user reads the security message a predetermined number of times. The time consumed after the initial reading operation is used to automatically delete the security message when a predetermined time elapses from a specific time at which the reception user firstly reads the security message. The number of abnormal reading attempts is used to automatically delete the security message when the reception user attempts to read the security message at an unreadable position by more than a predetermined number of times. More Specifically, if current position information of a reading attempt position of the reception user is different from the reading position information by more than a predetermined number of times, the number of abnormal reading attempts automatically deletes the security message.

The specific time is used to automatically delete the security message at a predetermined time. The re-transmission attempt is used to automatically delete the security message when the reception user attempts to re-transmit the security message to a third party. The separation from the reading area is adapted to automatically delete the security message when the reception mobile terminal 110 leaves a predetermined area corresponding to the readable position. For example, provided that a specific conference room is determined to be such a readable position and then a security message is transmitted, the security message is automatically deleted when the reception mobile terminal 110 receives the security message at the conference room and leaves the conference room, such that the contents of the security message are not exposed to others.

The MPU 600 asks the user for establishment of the ESN encryption request using the display 610 at step 1014. If the security message is ESN-encrypted and the user wishes to transmit the ESN-encrypted security message to the reception mobile terminal 110, the MPU determines to establish the ESN encryption request. If the user determines to establish the ESN encryption request, the ESN encryption request is established on the security message at step 1016.

If the user does not determine to establish the ESN encryption request at step 1014 or performs the above step 1016, then the MPU 600 asks the user for attachment of the reading guide information using the display 610 at step 1018. If the user selects the attachment of the reading guide information at step 1018, the reading guide information entered by the key input unit 608 from the user is attached to the security message at step 1020. If the user does not determine to attach the reading guide information to the security message at step 1018 or the above step 1020 is performed, the MPU 600 asks the user for the deletion condition setup information using the display 610 at step 1022.

If the user determines to establish the deletion condition at step 1022, a deletion condition determined by a user's key signal entered by the key input unit 608 is established on the security message. However, if the user does not determine to establish the deletion condition at step at step 1022, or the step 1024 is performed, then the MPU 600 transmits the message at step 1026.

A general message or the security message is transmitted to a user-selected mobile terminal (i.e., the reception mobile terminal 110 which must receive the security message) at step 1026. In this case, the ESN encryption request setup, the reading guide information attachment, and the deletion condition setup are selectively applied to the security message.

The above-described additional information, i.e., a true or false security message, security type, a presence or absence of ESN encryption request setup, a presence or absence of the reading guide information attachment, the reading guide information, a presence or absence of deletion conditions, and deletion conditions, must be checked by the mobile communication network 104 and/or the reception mobile terminal 110, such that the aforementioned additional information must be included in the security message and must be transmitted to a destination. If an additional message format including a field used to transmit the additional information is defined and used, the additional information can be included in the security message and can then be transmitted. However, in this case, the additional information is not compatible with the general message service. Therefore, in association with the mobile terminals 100 and 110 of the present invention, it is preferable that some parts of a user data field used for transmitting the message contents are defined and used as a field for transmitting the aforementioned additional information. In this case, the user data field is adapted to transmit the message contents of the general message.

Figure 11:
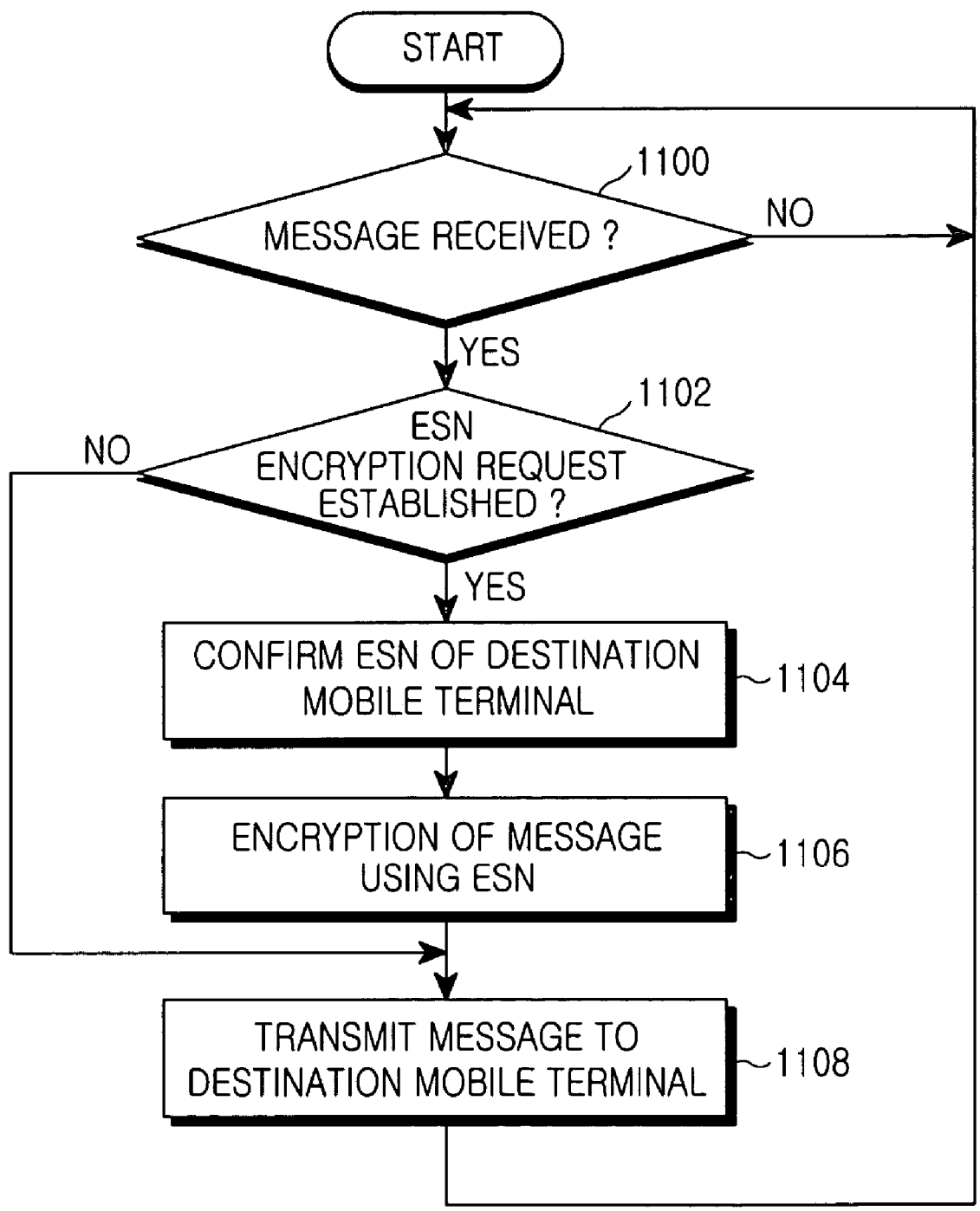
FIG. 11 is a flow chart illustrating a message service method for performing a security message service of a message server in accordance with an embodiment of the present invention.

FIG. 11 is a flow chart illustrating a message service method for performing a security message service of a message server in accordance with an embodiment of the present invention. Referring to FIG. 11, the message service method includes a plurality of steps 1100-1108, which are executed by the message server 106 of the mobile communication network 104. At step 1100-1102, upon receiving a message from the transmission mobile terminal 100, the message server 106 determines if the ESN encryption request is established. If the received message is either a security message wherein the ESN encryption request is not established, or a general message, the received message is transmitted to the reception mobile terminal 110 at step 1108.

If the received message is the security message wherein the ESN encryption request is established, the destination mobile terminal's ESN stored in the mobile communication network 104, i.e., the reception mobile terminal 110's ESN, is confirmed at step 1104. Thereafter, the ESN of the reception mobile terminal 110 is used as an encryption key at step 1106, and the encrypted message is transmitted to the reception mobile terminal 110. Therefore, if the transmission mobile terminal 100 establishes the ESN encryption request on the security message, the security message is encrypted by the ESN of the reception mobile terminal 110 in the mobile communication network 104, and the ESN encryption result is transmitted to the reception mobile terminal 110.

Figure 12:
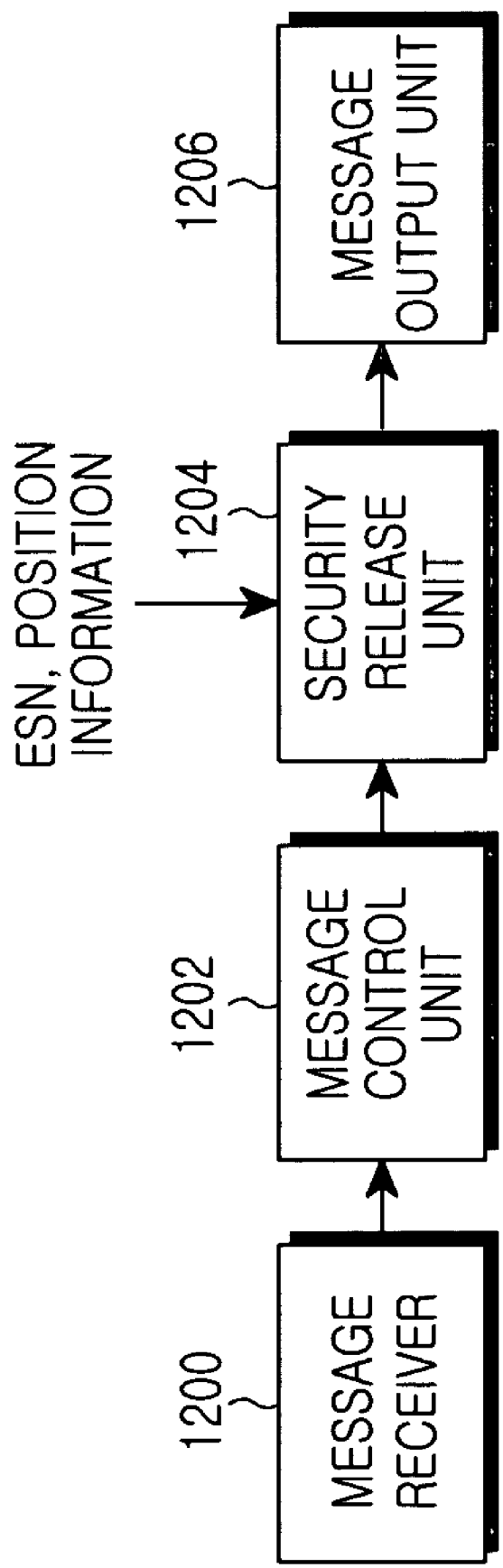
FIG. 12 is a block diagram illustrating a software module for receiving a security message of a mobile terminal in accordance with an embodiment of the present invention.

FIG. 12 is a block diagram illustrating a software module for receiving the security message using the MPU 600 of the reception mobile terminal 110 in accordance with an embodiment of the present invention. Referring to FIG. 12, the software module includes a message receiver 1200 for receiving a message, a message control unit 1202 for storing/deleting the received message, a security release unit 1204 for releasing the security setup mode using the ESN and/or position information to the security message, and a message output unit 1206 for outputting the message contents.

Figure 13:
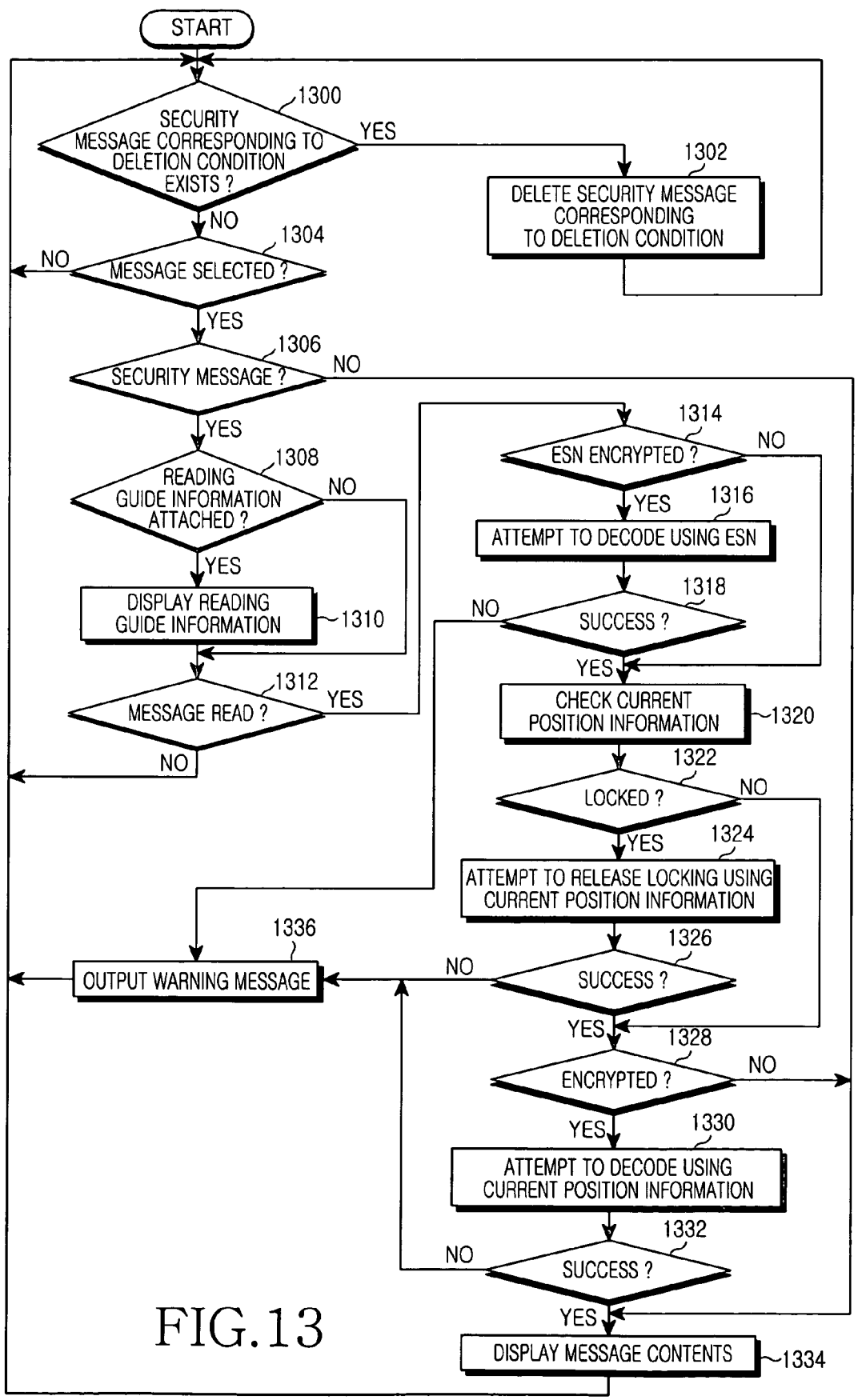
FIG. 13 is a flow chart illustrating a message reception method for performing a security message reception process of a mobile terminal in accordance with an embodiment of the present invention.

FIG. 13 is a flow chart illustrating a method for performing the security message reception process using the MPU 600 of the reception mobile terminal 110 in accordance with an embodiment of the present invention. The MPU 600 of the reception mobile terminal 110 determines if a security message corresponding to the deletion condition determined by the transmission user exists in the reception message at steps 1300-1302. If there is no security message corresponding to the deletion message, the MPU 600 of the reception mobile terminal 110 determines if the user selects a message to be read from among the received messages at step 1304.

If a security message associated with a deletion condition determined by the transmission user from among a variety of deletion conditions (i.e., 'the number of reading times', 'a time consumed after an initial reading operation', 'the number of abnormal reading attempts', 'a specific time', 'a re-transmission attempt', and 'separation from a reading area') exists in the reception security message at steps 1300-1302, the MPU 600 of the reception mobile terminal 110 deletes a corresponding security message. For example, provided that the transmission user determines 'the number of abnormal reading attempts' to be three times as such a deletion condition, determines 'the time consumed after the initial reading operation' to be 'immediate destruction', and transmits a security message, the MPU 600 immediately deletes a corresponding security message when the reception user attempts to read the message at least three times at a reading position different from a user-selected reading position or normally reads the message.

If the user selects one message or either one of a plurality of received messages using the key input unit 608 at step 1304, the MPU 600 determines whether a corresponding message is a security message at step 1306. If the message selected by the user is not the security message, i.e., the message selected by the user is a general message, the MPU 600 displays the message contents on the display 610 at step 1334. Thereafter, after the MPU 600 finishes displaying the message contents at step 1334, the MPU 600 returns to steps 1300-1304.

However, if the message selected by the user is the security message, the MPU 600 displays the fact that the message is the security message on the display 610, and the MPU 600 determines if the reading guide information is attached to the message at step 1308. If the reading guide information is not attached to the message at step 1308, the MPU 600 proceeds to step 1312. However, if the reading guide information is attached to the message at step 1308, the reading guide information attached by the transmission user is displayed on the display 610, and the MPU 600 proceeds to step 1312.

If the display 610 displays a specific message indicates the security message when the user selects the specific message, a correct user carrying the mobile terminal 110 moves to a prescribed readable position, and attempts to read the corresponding security message. In this case, if the display 610 displays the reading guide information because the transmission user attaches the reading guide information to the security message, the reception user moves to the readable position with reference to the reading guide information.

The MPU 600 determines if the user attempts to read the message at step 1312. If the MPU 600 does not attempt to read the message at step 1312, it returns to steps 1300-1304. However, if the MPU 600 attempts to read the message at step 1312, it determines if the corresponding security message is ESN-encrypted at step 1314.

If the corresponding security message is not ESN-encrypted at step 1314, the MPU 600 proceeds to step 1320. If the corresponding security message is ESN-encrypted at step 1314, the MPU 600 proceeds to step 1316. The MPU 600 attempts to decode the security message using the reception mobile terminal 110's ESN as a decoding key at step 1316. The decoding operation performed at step 1316 is executed using an algorithm capable of checking the success or failure of decryption.

After performing the decoding operation, the MPU 600 determines the decryption success or failure at step 1318. If the decryption success is determined at step 1318, the MPU 600 proceeds to step 1320. However, if the decryption failure is determined at step 1318, the MPU 600 proceeds to step 1336.

The MPU 600 determines current position information of the reception mobile terminal 110 at step 1320. For example, longitude and latitude information of a current position of the reception mobile terminal 110 can be recognized as current position information on the condition that the GPS module 626 receives a position signal from a GPS satellite, or longitude and latitude information of the serving base station 108 can be recognized as current position information upon receiving the longitude and latitude information from the serving base station 108.

Thereafter, the MPU 600 determines if a security mode for the security message is locked at step 1322. If the security mode for the security message is locked at step 1322, the MPU 600 attempts to release the locking mode using current position information as a release key at step 1324. If the security mode is not locked but is encrypted, the MPU 600 proceeds to steps 1328 and 1330. The locking mode release at step 1324 is executed using an algorithm capable of checking the success or failure of the locking release.

After attempting to release the locking mode, the MPU 600 determines the success or failure of the locking release at step 1326. If the failure of the locking release is determined, the MPU 600 proceeds to step 1336. If the success of the locking release is determined, the MPU 600 proceeds to step 1328, such that the MPU 600 determines if the security message whose locking mode is released is encrypted at step 1328.

If the security message, whose locking mode is released, is encrypted at step 1328, the MPU 600 attempts to decode the encrypted contents of the security message using current position information as a decoding key. However, if the security message, whose locking mode is released, is not encrypted at step 1328, the MPU 600 goes to step 1334. The decoding operation is executed using an algorithm capable of checking the success or failure of decryption at step 1330. After attempting to decode the encrypted contents of the security message at step 1330, the MPU 600 determines the success or failure of decryption at step 1332. If the success of the decryption is determined at step 1332, the MPU 600 goes to step 1334. However, if the failure of the decryption is determined at step 1336, the MPU 600 proceeds to step 1336.

The MPU 600 displays either the locking-released message or the message contents decrypted by the decoding operation on the display 610 at step 1334. Thereafter, after the MPU 600 finishes displaying the message at step 1334, the MPU 600 returns to steps 1300-1304. Accordingly, the locking-released message (i.e., security-released message) and/or the message contents decrypted by the decoding operation are displayed on the display 610. However, the contents of the message are not stored or a security setup state of a corresponding security message is not changed. Therefore, if the reception user reads the security message at a readable position and then moves to another place, the message automatically returns to an original security setup state, such that the security of the message is maintained and transmitted even though the corresponding security message is retransmitted to a third party.

A warning message is outputted at step 1336, and the MPU 600 proceeds to steps 1300-1304. For example, a warning message for warning a user of an abnormal reading attempt may be displayed on the display 610, and at the same time the warning sound is output via the speaker 616.

Therefore, the reception user can view/read the contents of the security message received only when the reception user carries the mobile terminal and is positioned at a predetermined place corresponding to reading position information set by the transmission user.

If the ESN encryption request is established when the transmission user transmits the security message, the reception user can read the contents of the security message only using a specific mobile terminal set by the transmission user. Therefore, if a fraudulent user attempts to read the security message by compulsorily extracting the security message from the reception mobile terminal, or the security message is transmitted to an unwanted mobile terminal due to the mistake of the transmission user, the contents of the security message are not exposed to the third party.

The present invention encrypts or locks the message using position information as a key signal. The user can check the message at only a prescribed place, such that the unexpected outflow of information can be prevented. For example, if a specific company transmits a message including security to all staff members, the present invention enables the staff members to read the message only when they are positioned in a predetermined office building of the company. Particularly, provided that a corresponding area is physically secured, the present invention can prevent information from being exposed to the third party even though the mobile terminal is stolen or lost.

Accordingly, the present invention enables the transmission user to share only information associated with an encryption key, instead of a real encryption key, with the reception user, resulting in improved security of a message service. The present invention uses a key signal as position information, such that it is applicable to a security message service for restricting the message reading position throughout the world.

The transmission user establishes a variety of deletion conditions for the security message and transmits the security message having the deletion conditions. The reception mobile terminal automatically deletes a security message corresponding to the deletion condition, such that the present invention can prevent the security message from being fraudulently exposed to the third party, and can prevent the security message from being maintained for a time longer than a predetermined time. Particularly, the reading position is limited to enable attendants of the conference to read the message at only a prescribed position (e.g., the conference room), such that the security message is automatically deleted when the attendants leave the conference room, resulting in improved security.

If the reception mobile terminal's function for displaying the contents of a reception message is determined by a user, the message contents are not displayed on the display even though the security message arrives at the reception mobile terminal, and the reception mobile terminal indicates that the security message has been received. In this case, if the reading guide information is attached to the corresponding security message, the display is designed to display the reading guide information.

As is apparent from the above description, although the present invention generates the position reservation message using the mobile terminal and transmits the generated position reservation message, it should be noted that the present invention is also applicable to message transmission using a message service server over the Internet. Also, the present invention is also applicable to a general time-reservation transmission service. In this case, a two-dimensional message service considering time and space is available, resulting in greater convenience of the user.

For example, the present invention additionally ESN-encrypts the security message according to a user's selection signal, or attaches the reading guide information to the security message in order to allow the reception user to refer to the ESN-encrypted result or the attached reading guide information. The present invention establishes a predetermined deletion condition, such that it automatically deletes the security message if a current state is equal to the deletion condition after the reception mobile terminal has received the security message. However, it should be noted that the aforementioned examples may be omitted or may be selectively applied to a necessary object.

In order to further increase the security of the message, the present invention may further include a user authentication process. Although the present invention determines the success or failure of security release of the security message, such that the message contents are displayed only when the success of security release of the security message is determined, the present invention may display the message contents, whose security is released, on the display, regardless of the success or failure of decryption of the message contents. In this case, although the security-released message contents are displayed on the display when the reception mobile terminal is positioned at a position different from the reading position information, the displayed message contents are wrongly decrypted such that the user is unable to read the message contents, resulting in the maintenance of the message security.

Although preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. A method for providing a message service for use in a mobile communication terminal, comprising the steps of:
   establishing a security mode using reading position information as an encryption key and a locking key and for determining a readable position at which a message to be transmitted can be read such that the message is encrypted and locked;
   generating a security message;
   designating a destination mobile communication terminal; and
   transmitting the security message to the mobile communication terminal wherein the security message, which is a message encrypted using the reading position information as an encryption key, is locked using the reading position information as a locking key, and the release of the security mode is performed using the current position information as a release key to release the locking of the security message, and is performed by decoding the security message using the current position information as a decoding key.

2. The method according to claim 1, wherein the transmission step of transmitting the security message comprises the step of:
   attaching reading guide information for informing a user of the destination mobile terminal of information associated with the readable position, to the security message.

3. The method according to claim 1, wherein the transmission step of transmitting the security message further comprises the step of:
   establishing a deletion condition for designating a condition to be deleted after the security message is received in the destination mobile terminal, on the security message.

4. The method according to claim 3, wherein the deletion condition includes at least one of 'a number of reading times', 'a time consumed after an initial reading operation', 'a number of abnormal reading attempts', 'a specific time', 'a re-transmission attempt', and 'separation from a reading area'.

5. The method according to claim 1, wherein the transmission step of transmitting the security message comprises the step of:
   establishing an ESN (Electronic Serial Number) encryption request to request encryption of the security message from a mobile communication network using an ESN of the destination mobile terminal.

6. The method according to claim 1, wherein the step of establishing the security mode comprises encrypting the message to be transmitted by adapting the reading position information as an encryption key.

7. The method according to claim 6, wherein the step of establishing the security mode further comprises using the reading position information as a locking key, such that the message to be transmitted is locked.

8. The method according to claim 3, wherein the step of establishing the security mode comprises using the reading position information as an encryption key, such that the message to be transmitted is encrypted.

9. The method according to claim 8, wherein the step of establishing the security mode further comprises using the reading position information as a locking key, such that the message to be transmitted is locked.

10. A method for providing a message service to a destination mobile communication terminal over a mobile communication network, comprising the steps of:
    receiving a security message in which an ESN (Electronic Serial Number) encryption request is established wherein the security message, which is a message encrypted using the reading position information as an encryption key, such that the message to be transmitted is encrypted and is locked using the reading position information as a locking key, and the release of the security mode is performed using the current position information as a release key to release the locking of the security message, and is performed by decoding the security message using the current position information as a decoding key;

encrypting the security message using an ESN of the destination mobile terminal associated with the security message as an encryption key; and transmitting the ESN-encrypted security message to the destination mobile terminal.

11. A method for providing a message service for use in a mobile communication terminal, comprising the steps of:

receiving a security message in which a security locking-mode is established from reading position information indicating a readable position;

releasing the security locking-mode of the security message using current position information of the mobile communication terminal when a user requests to read the security message; and displaying contents of the message in which the security locking-mode is released and the release of the security mode is performed using the current position information as a release key to release the locking of the security message, and is performed by decoding the security message using the current position information as a decoding key, wherein the security message, which is a message encrypted using the reading position information as an encryption key, is locked using the reading position information as a locking key, and the release of the security mode is performed using the current position information as a release key to release the locking of the security message, and is performed by decoding the security message using the current position information as a decoding key.

12. The method according to claim 11, further comprising the step of:

outputting a warning message when the security mode of the security message is not released.

13. The method according to claim 11, wherein the release step of releasing the security mode of the security message comprises the step of:

identifying the current position information using a position signal received from a GPS (Global Positioning System) satellite.

14. The method according to claim 11, wherein the release step of releasing the security mode of the security message comprises the step of:

identifying the current position information using a sewing base station of the mobile communication terminal.

15. The method according to claim 11, further comprising the step of:

displaying reading area guide information when reading area information identifying information associated with the readable position is attached to the security message.

16. The method according to claim 11, wherein the release step of releasing the security mode of the security message comprises the step of:

decoding the security message utilizing an ESN (Electronic Serial Number) of the mobile communication terminal as a decoding key when the security message is ESN-encrypted.

17. The method according to claim 11, wherein the security message is a message encrypted using the reading position information as an encryption key, and the release of the security mode is performed by decoding the security message using the current position information as a decoding key.

18. The method according to claim 11, further comprising the steps of:

determining whether the security message corresponds to a deletion condition for indicating a condition to be deleted after the security message is received, if the deletion condition is established on the security message,; and deleting the security message, if the security message corresponds to the deletion condition.

19. The method according to claim 18, wherein the deletion condition includes at least one of 'a number of reading times', 'a time consumed after an initial reading operation', 'a number of abnormal reading attempts', 'a specific time', 'a retransmission attempt', and 'separation from a reading area'.

20. The method according to claim 18, wherein the security message is a message encrypted using the reading position information as an encryption key, and the release of the security mode is performed by decoding the security message using the current position information as a decoding key.

21. The method according to claim 18, wherein the security message, which is a message encrypted using the reading position information as an encryption key, is locked using the reading position information as a locking key.

22. A system for providing a message service, comprising:

a mobile terminal for establishing a security mode using reading position information for designating a readable position at which a message to be transmitted can be read, generating a security message, establishing an ESN (Electronic Serial Number) encryption request for requesting ESN encryption of the security message, and then transmitting the security message wherein the security mode establishment is performed by locking and encrypting the message to be transmitted by adapting and using the reading position information as the locking key and encryption key, and wherein the release of the security mode is performed by releasing the locking of the security message by adapting the reading position information as the release key and decoding the security message using the reading position information as a decoding key;

a mobile communication network for receiving the security message in which the ESN encryption request is established, encrypting the security message, and transmitting the encrypted security message; and a destination mobile terminal for receiving the encrypted security message, decoding the encrypted security message using an ESN as a decoding key when a reading request for the security message is received from a user, releasing a security mode of the security message using current position information of the destination mobile terminal, and displaying message contents, wherein the encrypted security message is encrypted using an ESN of the destination MS associated with the security message as an encryption key.

23. The system according to claim 22, wherein the security mode establishment is performed by encrypting the message to be transmitted by adapting the reading position information as the encryption key, and is performed by locking the message to be transmitted by adapting the reading position information as the locking key, and wherein the release of the security mode is performed by releasing the locking of the security message by adapting the current position information as the release key, and is performed by decoding the security message by adapting the current position information as the decoding key.

* * * * *